US012580283B2

(12) United States Patent　　　(10) Patent No.:　US 12,580,283 B2
Burkman　　　　　　　　　　　　　(45) Date of Patent:　Mar. 17, 2026

(54) BUSSED ELECTRICAL CENTER WITH DIRECT CONTACTOR MOUNTING

(71) Applicant: FORD GLOBAL TECHNOLOGIES, LLC, Dearborn, MI (US)

(72) Inventor: Wesley Edward Burkman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 929 days.

(21) Appl. No.: 17/098,904

(22) Filed: Nov. 16, 2020

(65) Prior Publication Data

US 2022/0158148 A1　　May 19, 2022

(51) Int. Cl.
| | |
|---|---|
| *H01M 50/583* | (2021.01) |
| *B60K 6/28* | (2007.10) |
| *H01M 10/42* | (2006.01) |
| *H01M 50/50* | (2021.01) |
| *H01M 50/296* | (2021.01) |

(52) U.S. Cl.
CPC ............. *H01M 50/583* (2021.01); *B60K 6/28* (2013.01); *H01M 10/425* (2013.01); *H01M 50/50* (2021.01); *H01M 50/296* (2021.01); *H01M 2200/103* (2013.01)

(58) Field of Classification Search
CPC .. H01M 50/583; H01M 50/50; H01M 50/296; H01M 10/425
See application file for complete search history.

(56) References Cited

U.S. PATENT DOCUMENTS

| | | | |
|---|---|---|---|
| 6,051,782 A | 4/2000 | Wagner | |
| 2012/0244398 A1 | 9/2012 | Youngs et al. | |
| 2017/0150630 A1* | 5/2017 | Lyon ................... | H01M 10/425 |
| 2018/0043783 A1 | 2/2018 | Tabatowski-Bush et al. | |

FOREIGN PATENT DOCUMENTS

| | | |
|---|---|---|
| KR | 101446529 B1 | 10/2014 |
| WO | 9805052 A1 | 2/1998 |

* cited by examiner

*Primary Examiner* — Jimmy Vo
(74) *Attorney, Agent, or Firm* — David B Kelley; Brooks Kushman P.C

(57) ABSTRACT

A traction battery assembly includes a traction battery having a plurality of cells secured in one or more arrays by support structure. A contactor is electrically connected to the traction battery and has a housing mounted to the support structure, a pair of terminals extending from the housing, and a switching arrangement configured to electrically connect the terminals when closed. A pre-charge module is connected to the traction battery solely through direct attachment to the contactor. The module has a pre-charge circuit electrically connected to the terminals and a case that is directly attached to the housing of the contactor.

20 Claims, 6 Drawing Sheets

BUSSED ELECTRICAL CENTER WITH DIRECT CONTACTOR MOUNTING

TECHNICAL FIELD

This disclosure relates to traction batteries and more specifically to bussed electrical centers for traction batteries.

BACKGROUND

An electrified powertrain may include an engine and an electric machine. The torque (or power) produced by the engine and/or the electric machine can be transferred through a transmission to the driven wheels to propel the vehicle. A traction battery supplies energy to the electric machine.

SUMMARY

According to one embodiment, a traction battery assembly includes a traction battery having a plurality of cells secured in one or more arrays by support structure. A contactor is electrically connected to the traction battery and has a housing mounted to the support structure, a pair of terminals extending from the housing, and a switching arrangement configured to electrically connect the terminals when closed. A pre-charge module is connected to the traction battery solely through direct attachment to the contactor. The module has a pre-charge circuit electrically connected to the terminals and a case that is directly attached to the housing of the contactor.

According to another embodiment, a traction battery assembly includes a traction battery having a plurality of cells secured in one or more arrays by support structure and a contactor electrically connected to the fraction battery. The contractor includes a housing mounted to the support structure, a pair of terminals extending from the housing, and a switching arrangement configured to electrically connect the terminals when closed. a mounting sleeve disposed around and secured to the housing. A pre-charge module is solely connected to the traction battery by attachment to the mounting sleeve, the module including a pre-charge circuit electrically connected to the terminals and a case that may be directly attached to the mounting sleeve.

According to yet another embodiment, a bussed electrical center (BEC) of a traction battery includes a contactor having a housing configured to be mounted to a traction battery, a pair of terminals extending from the housing, and a switching arrangement configured to electrically connect the terminals when closed. A pre-charge module includes a pre-charge circuit electrically connected to the terminals and a case that is directly attached to the housing of the contactor such that the contactor is a sole connection between the pre-charge module and the traction battery.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure may include various internal and external circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of discrete passive and active components such as resistors, capacitors, transistors, amplifiers, analog/digital converters (ADC or A/D converters), microprocessors, integrated circuits, non-transitory memory devices (e.g., FLASH, random access memory (RAM), read only memory (ROM), electrically programmable read only memory (EPROM), electrically erasable programmable read only memory (EEPROM), or other suitable variants thereof) and software which cooperate with one another to perform operation(s) disclosed herein. In addition, any one or more of the electric devices may be configured to execute a computer program that is embodied in a non-transitory computer readable storage medium that includes instructions to program a computer or controller to perform any number of the functions as disclosed.

Figure 1:
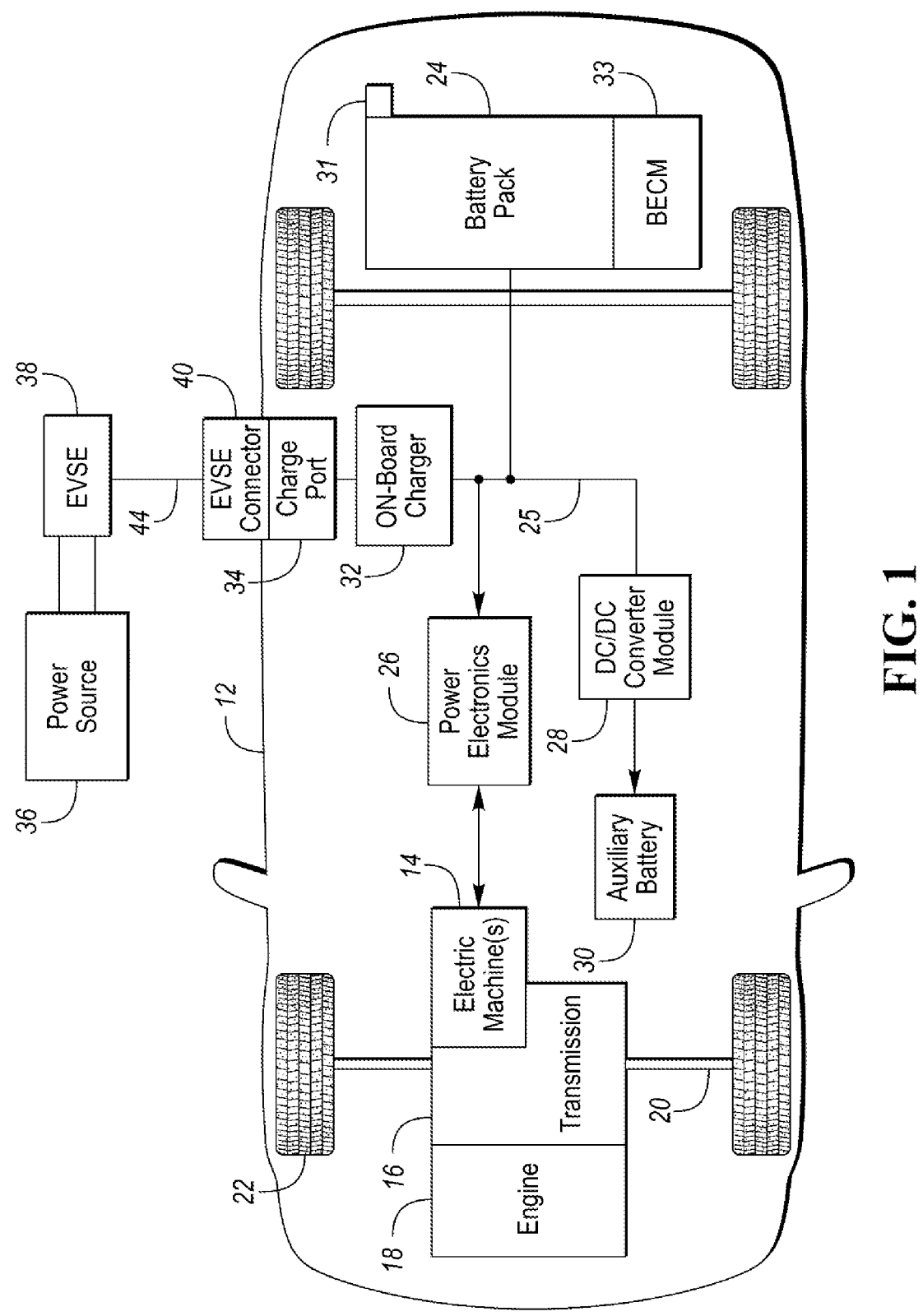
FIG. 1 is a schematic diagram of a plug-in hybrid vehicle.

FIG. 1 depicts a schematic of a plug-in hybrid-electric vehicle (PHEV). Certain embodiments, however, may also be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and slowing capability when the engine 18 is turned ON or OFF. The electric machines 14 also act as generators and can provide fuel economy benefits by recovering energy through regenerative braking. The electric machines 14 reduce pollutant emissions and increase fuel economy by reducing the workload of the engine 18.

A traction battery assembly 24 stores energy that can be used by the electric machines 14. The traction battery 24 may provide a high-voltage (HV) direct current (DC) output from one or more battery cell arrays, sometimes referred to as battery cell stacks, within the traction battery 24. The battery cell arrays may include one or more battery cells.

The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally regulated with a thermal-management system. Examples of thermal-management systems include air cooling systems, liquid cooling systems, and a combination of air and liquid systems.

The traction battery 24 may be electrically connected to one or more power electronics modules 26 through one or more contactors. The one or more contactors isolate the traction battery 24 from other components when opened and connect the traction battery 24 to other components when closed. A power electronics module 26 is also electrically connected to the electric machines 14 and a high-voltage bus 25 and provides the ability to bi-directionally transfer energy between the traction battery 24 and the electric machines 14. For example, a traction battery 24 may provide a direct current (DC) voltage while the electric machines 14 may use a three-phase alternating current (AC) to function. The power electronics module 26 may convert the DC voltage to a three-phase AC current used by the electric machines 14. In a regenerative mode, the power electronics module 26 may convert the three-phase AC current from the electric machines 14 acting as generators to the DC voltage used by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A system may include a DC/DC converter module 28 that converts the high-voltage DC output of the traction battery 24 to a low-voltage DC supply that is compatible with other vehicle components. Other high-voltage loads, such as compressors and electric heaters, may be connected directly to the high-voltage supply without the use of a DC/DC converter module 28. In a vehicle, the low-voltage systems are electrically connected to an auxiliary battery 30 (e.g., a 12-volt battery). In other embodiments, the battery 30 may be 24 or 48 volts.

A battery electronics control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature sensor. The temperature sensor 31 may be in communication with the BECM 33 to provide temperature data regarding the traction battery 24.

The vehicle 12 may be recharged by a charging station, such as electric vehicle supply equipment (EVSE) 38, connected to an external power source 36. The external power source 36 may be an electrical power distribution network or grid as provided by an electric utility company. As shown, the external power source may be electrically coupled to the EVSE 38. Although the EVSE 50 is shown external to electric vehicle 10, it is also contemplated that EVSE 38 may be located within electric vehicle 12. The EVSE 38 capable of providing DC and/or AC electric power to the EVSE 38.

The EVSE 38 may receive and transfer the received electrical power through a cord 44 and connector 40 that plugs into a mating charge port 56 on the electric vehicle 12. As one example, the external power may be AC power received at the charge port 56 that is converted to DC power by an on-board charger 32 located within the electric vehicle 12. The on-board charger 32 may then operate to charge the traction battery 24. Alternatively, the on-board charger 32 may be located in the EVSE 38 external to the electric vehicle 10.

It is contemplated that the EVSE 38 may be realized in different mechanical configurations including a vehicle charger, a charging station, or a charger. It is also contemplated that the EVSE 38 may be installed as wall-mounted units in a garage, alongside a building where vehicles typically park, or in a stand-alone unit. The EVSE 38 may be a cord set which is sometimes referred to as a travel charger, portable charger, or handheld charger.

The connector 40 and charge port 34 may utilize a conductive connection in which the electrical conductors (pins) in one connector make physical contact with the electrical conductors (pins) in the other connector. However, it is also contemplated that a wireless power transfer (WPT) system may be employed where a transmitter may provide electric power to a receiver without the use of physical electrical conductors (e.g., power may be transferred through free space). It is contemplated that the power output into a wireless field (e.g., magnetic induction, electric induction, etc.) may be received, captured by, or coupled by a "receiving coil" to achieve the power transfer.

The various components discussed may have one or more controllers to control and monitor the operation of the components. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, reference to "a controller" refers to one or more controllers. The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller within each of the subsystems identified above. Representative examples of parameters, systems, and/or components that may be directly or indirectly actuated using control logic executed by the controller. Used herein, "high voltage" refers to a voltage exceeding 42 V AC or 60 V DC. "Low voltage" refers to voltages that are not high.

Figure 2:
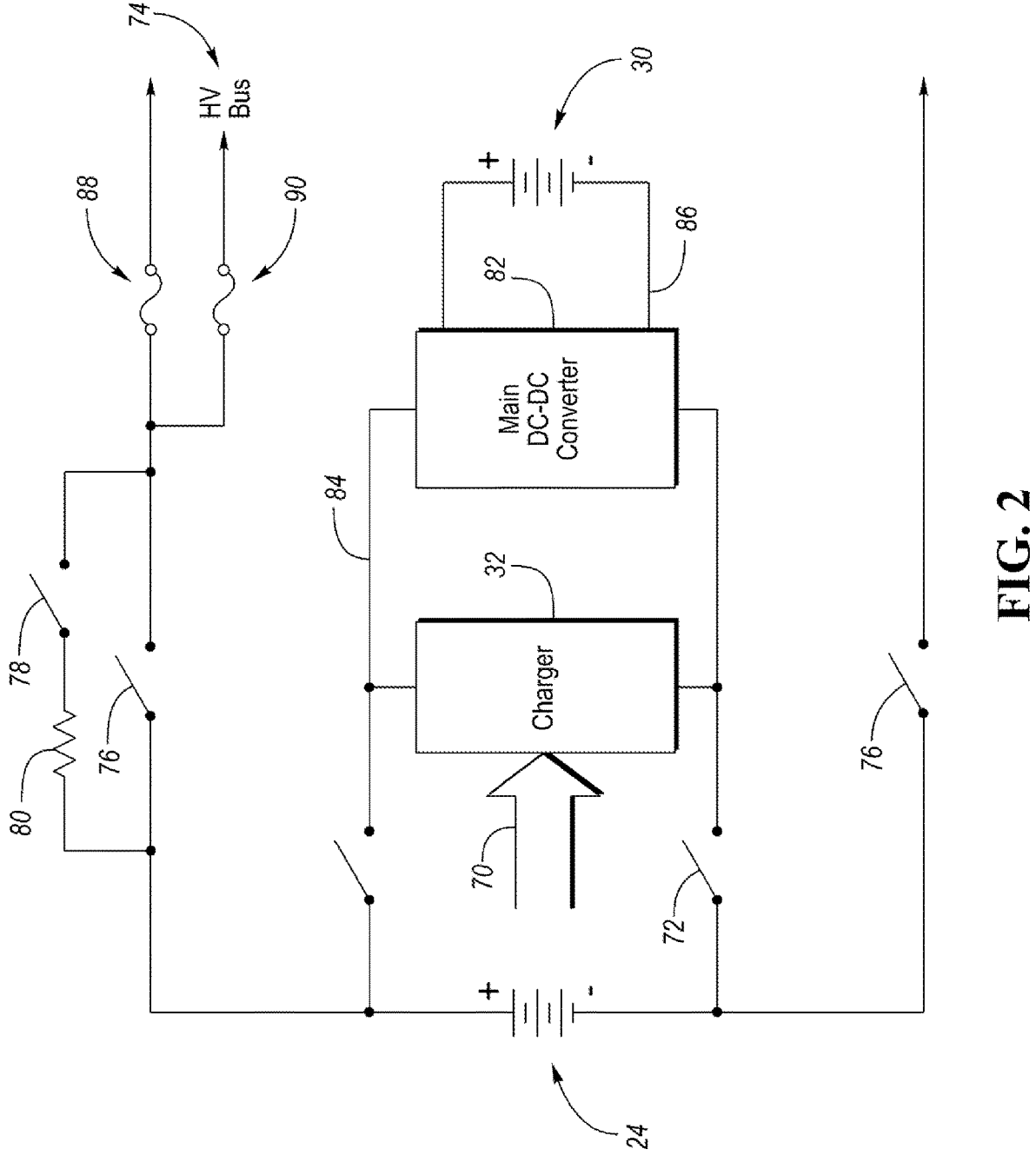
FIG. 2 is a diagram illustrating an example configuration of a vehicle high-voltage and low-voltage system according to an embodiment of this disclosure.

Referring to FIG. 2, in this embodiment, the on-board charger 32 receives an AC input voltage 70 from a source external to the vehicle, e.g., EVSE 38. The high-voltage traction battery 24 is coupled to the charger 32 through one or more charge contactors 72. The traction battery 24 is also coupled to a vehicle high-voltage bus 74 through one or more main contactors 76. The vehicle high-voltage bus 74 may include a power and return line in which the power line may be coupled to a positive terminal of the traction battery 24 and the return line may be coupled to a negative terminal of the traction battery 24. The traction battery 24 may also be coupled to the vehicle high-voltage bus 74 through a pre-charge contactor 78 and pre-charge resistor 80. A main DC-DC converter 82 may be connected to the charger bus 84. The main DC-DC converter 82 may convert high-voltage DC to a low-voltage DC compatible with the auxiliary battery 30. The auxiliary battery 30 and the low-voltage output of the main DC-DC converter 82 may connect to a low-voltage bus 86 that supplies 12-volt power to other modules in the vehicle. The low-voltage bus 86 may include a power and return line in which the power line may be coupled to a positive terminal of the auxiliary battery 30 and the return line may be coupled to a negative terminal of the auxiliary battery 30. Note that the system described is equally applicable when the low-voltage system 86 is other than 12V (e.g., 48V). The power line may include a junction and a pair of fuses 88, 90. While the charger 32 and the DC-DC converter 82 are shown are their own bus through contactors 72, this need not be the case. In some embodiments, the charger 32 and the DC-DC converter 82 may be on the bus 74 in which case the contactors 72 are eliminated.

The above-described contactors, fuses, etc. may be part of a bussed electrical center of the high-voltage battery 24. Bussed electrical centers (BECs) of the battery include many connections of various components such as contactors, over-current protection devices (OCPDs), resistors, capacitors, voltage sense nodes, and connectors. Locating and retaining these parts together was traditionally done with complex injection molded housings that contained all of these components in a large junction box. The connection of the various components then required a complex array of stamped and bent busbars. This, in combination with the unique injection molding, is costly.

To reduce cost and complexity, integrated BECs are disclosed that avoid the need for complex injection-molding housing and special busbars by directly mounting components, such as the pre-charge circuit, fuses, and the like, directly to the contactors, which are in turn mounted to a support structure of the battery either directly or through a simple substrate. In order to locate, retain, and connect the smaller components such as resistors, capacitors, small fuses, and connectors, a small box can be externally mounted directly on the large components, such as the contactor housing. This minimizes the interface distance between the large component and the small component; allows the use of wires for connecting small components as opposed to busbars which require unique stamping tooling; allows a common externally mounted box to be reused for multiple functions such as pre-charge components, small fuses, or capacitors; allows architecture changes to be made without having to change one single large injection molding tool; and allows BEC components to be mounted directly to a battery tray eliminating the need for large injection molded junction box housings.

Figure 3:
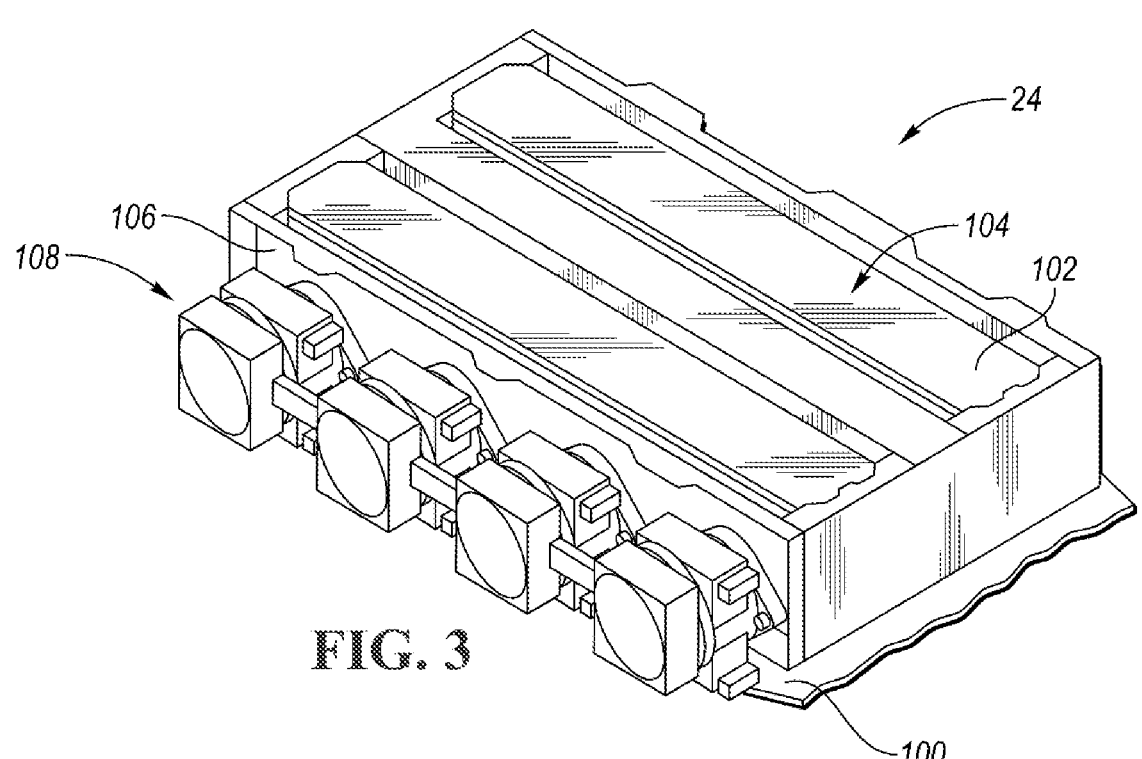
FIG. 3 is a diagrammatical perspective view of a traction battery.

FIG. 3 illustrates the traction battery assembly 24 according to one embodiment. The battery 24 includes a tray 100 that supports a plurality of battery cells 102 that may be arranged in one or more arrays 104, which in one or more embodiments is a linear stack of the cells 102. The cells 102 are secured in the arrays 104 by support structure 106 such as rods, plates, brackets, hardware, and the like. The battery assembly 24 includes a BEC 108 (shown enlarged for illustrative purposes) that may be arranged in one or more locations of the battery. The BEC 108 may be secured to the support structure 106.

Figure 4:
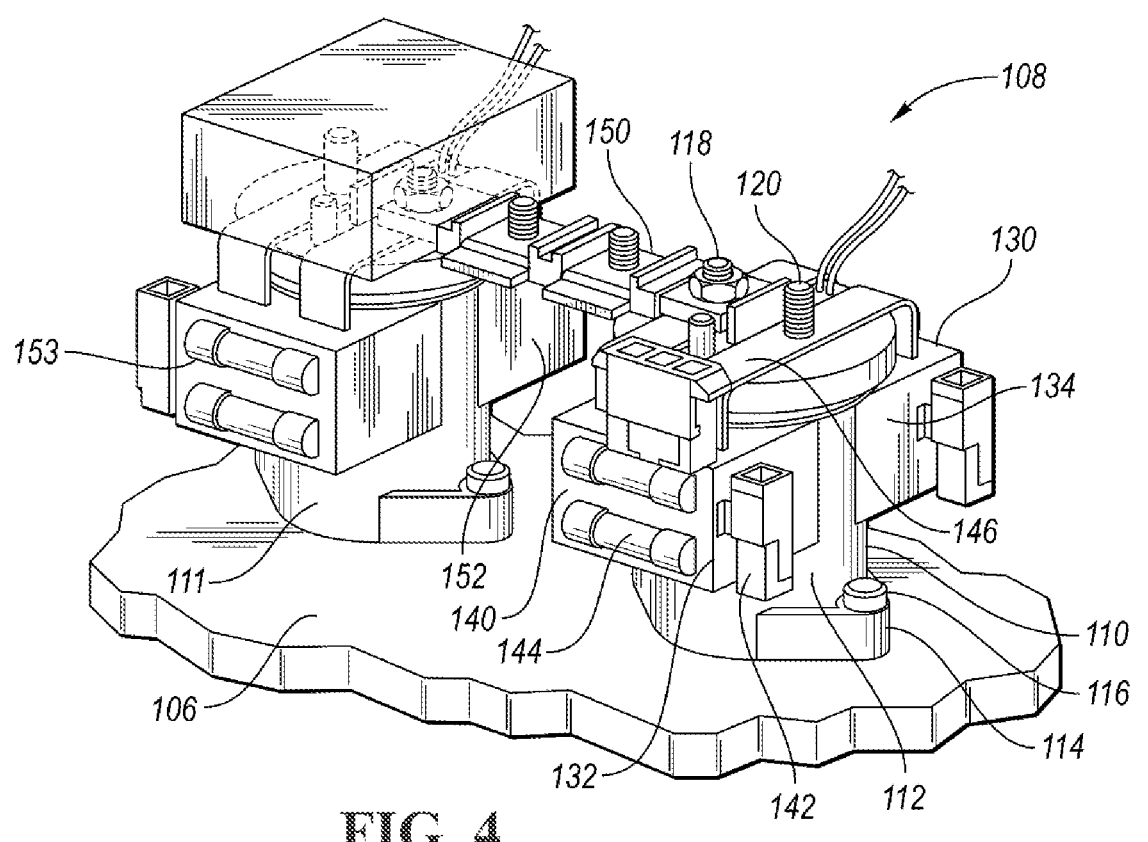
FIG. 4 is a perspective view of a pair of contactors supporting additional components of a bussed electrical center.

FIG. 4 illustrates a portion of an example BEC 108 including a pair of contactors 110 and 111 that are directly connected to the support structure 106, which is schematically shown as a plate, but may be a bracket, a side plate or other component of the traction battery 24. The contactor 110 includes housing 112 having mounting feet 114 that are used to secure the contactor 110 to the support structure 106. The mounting feet 114 may define holes that receive fasteners 116 therethrough to secure the contactor to the substrate. Disposed within the housing 112 is a switching arrangement configured to open and close the contactor 110. The switching arrangement may be a mechanical switch that is operated by an electric coil disposed within the housing. The coil is connected to a low-voltage circuit that when energized causes the switch to close and when deenergize allows the mechanical switch to open. A pair of terminals 118, 120 extend from a top of the housing 112. The terminals are electrically connected through the switching arrangement. When the switching arrangement is closed, the terminals are electrically connected to each other; when the switching arrangement is open, the terminals are electrically disconnected. Of course, other types of switching arrangements may be used. The terminals are configured to connect to busbars or other conductor. One of the busbars may be connected to the high-voltage battery and the other the busbars may be connected to the high-voltage bus. In this example, the contactor 110 is used to electrically connect the battery 24 with the high-voltage bus 74. The contactor 111 may have a same or similar structure, but the terminals may be connected to other components of the vehicle electrical system.

In order to improve packaging and reduce cost, other components of the BEC 108 may be directly mounted to the housing 112 of the contactor rather than securing all these various components to a complex injection molded housing. In the illustrated embodiment, the contactor 110 supports a pre-charge module 130 and a fuse assembly 132 for low power loads. The pre-charge module 130 and the fuse assembly 132 may be directly connected to the housing 112 of the contactor 110. The contactor 110 then serves as the sole means of attaching the pre-charge module 130 and the fuse assembly 132 to the traction battery.

The pre-charge module 130 includes a case 134 that includes first connection features configured to engage with second connection features of the housing 112 to secure the module 130 to the contactor 110. The connection features may be clips, guide members, fasteners, and the like as will be described in more detail below. Disposed within the case 134 is a pre-charge circuit such as the one shown in FIG. 2. The pre-charge circuit includes switching arrangement and a resistor that are disposed within the case. A pair of leads 133 (terminals) extend from the case 134 and are received on the terminals 118 and 120. The leads 133 electrically connect the pre-charge circuit to the terminals 118, 120. A connector and terminals for control of the pre-charge module is included as part of the case 134 or separately attached to the pre-charge module 130.

The fuse assembly 132 may be connected on the other side of the housing 112. The fuse assembly 132 also includes a case 140 that includes third connection features configured to engage with fourth connection features of the housing 112. The case 140 support circuitry and a pair of fuses 144 in the illustrated embodiment. Of course, more or less fuses may be provided. A terminal lead 146 may extend from the case 140 and connect to one of the terminals such as terminal 120. The fuse assembly 132 may include a pair of outputs, each associated with one of the fuses, and may support a voltage sense 142 of a voltage sensor.

The contactor 111 may be the same or similar to the contactor 110. The contactor 111 and 110 may be electrically connected to each other by a busbar 150. The contactor 111 may support a Y-capacitor module 152 that includes one or more Y-capacitors and associated circuitry. The capacitor module 152 may include connection features that are configured to engage with connection features on the housing of the contactor 111 similar to the connection features used for the contactor 110. The contactor 111 may also support another module for functionality, such as a fuse assembly 153.

Figure 5:
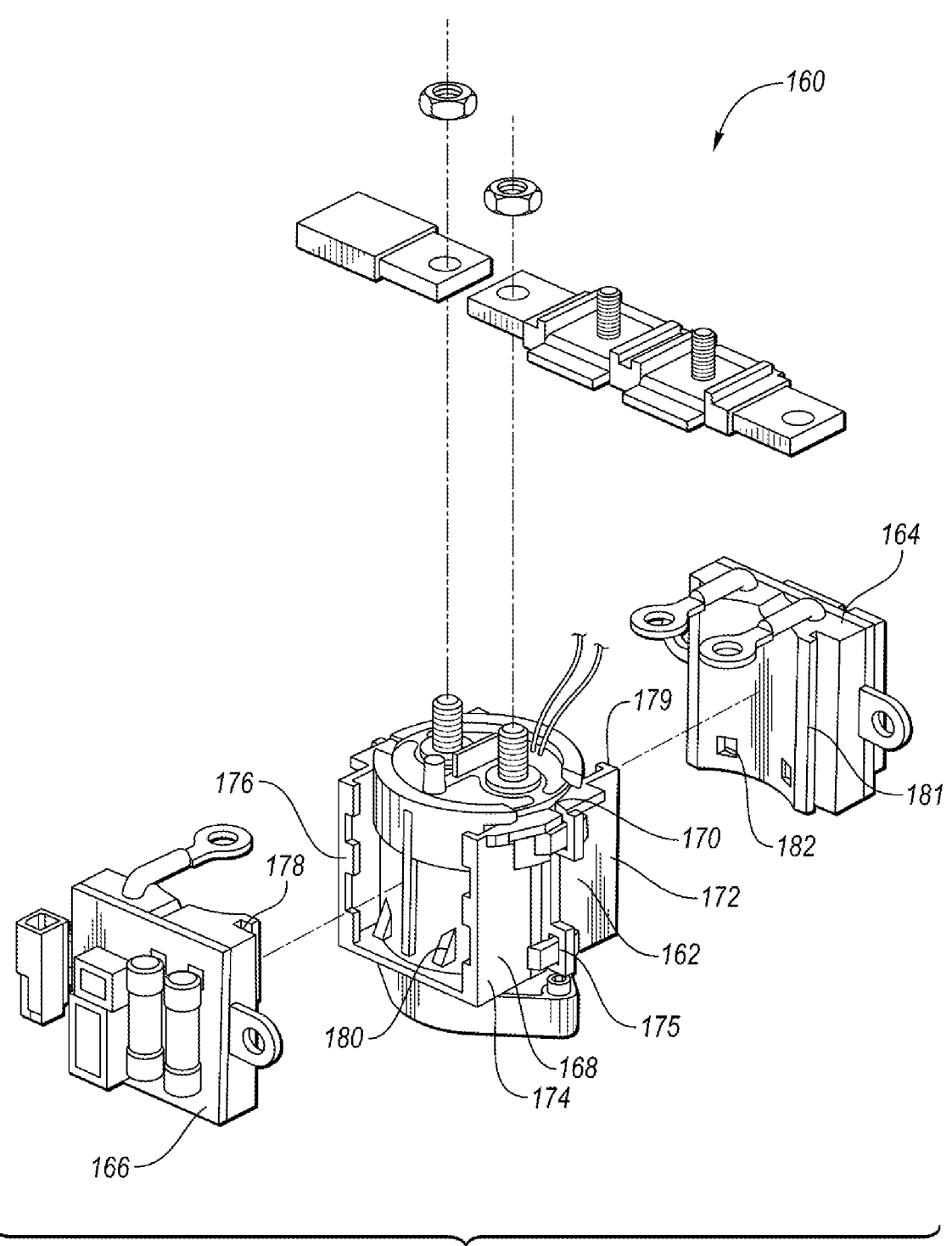
FIG. 5 is an exploded perspective view of a contactor assembly according to one embodiment.

FIG. 5 illustrates an exploded view of an example BEC 160. (The BEC 160 may include additional electric components, e.g., additional contactors, that are not shown.) A contactor 162 supports a pre-charge module 164 and a fuse assembly 166. In this embodiment, a support sleeve 168 is used to secure the pre-charge module 164 and the fuse assembly 166 to the contactor 162. The support sleeve 168 may be a two-piece sleeve that surrounds the housing 170 of the contactor 162. The sleeve includes a first piece 172 and a second piece 174 that connect to each other around of the housing 170. The pieces 172, 174 may include clips 175 (as shown) or other means (e.g., fasteners, guides, or adhesive) for securing the sleeve halves 172, 174 together. The support sleeve 168 includes connection features configured to cooperate with the connection features of the pre-charge module 164 and the fuse assembly 166 to secure these components to the contactor 162. In the illustrated embodiment, the sleeve 174 supports the fuse assembly 166, and the sleeve piece 172 supports the pre-charge module 164. The sleeve piece 174 includes a pair of guide members in the form of spaced apart rails 176, and the assembly 166 includes a pair of guide members in the form of grooves 178. The sleeve piece 172 and the module 164 may include the same or similar guide members 179, 181. The fuse assembly 166 is attached to the support sleeve 168 by sliding the grooves 178 onto the rails 176 until the clips 180 are received within slots (like slots 182 of module 164). The pre-charged module 164 may be secured to the support sleeve 168 in the same way. The above-described guide members are but one embodiment and, in alternative embodiments, the pre-charged module, the fuse assembly, or any other component, may be attached to the sleeve 168 by clips, snaps, fasteners, adhesive, interference fit, or any other means of joining.

Figure 6:
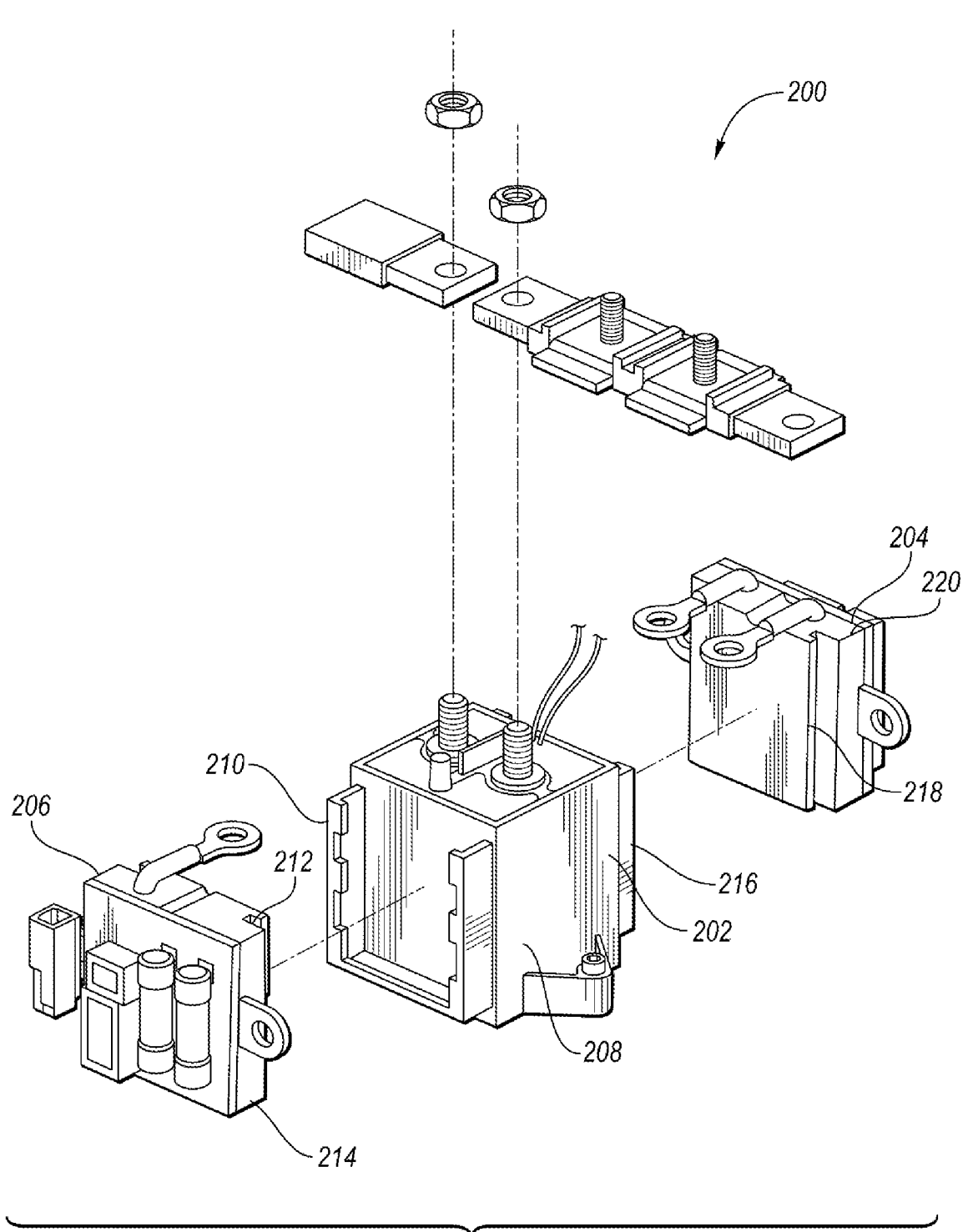
FIG. 6 is an exploded perspective view of a contactor assembly according to another embodiment.

FIG. 6 illustrates an exploded view of an example BEC 200. (The BEC 200 may include additional electric components, e.g., additional contactors, that are not shown.) A contactor 202 supports a pre-charge module 204 and a fuse assembly 206. In this embodiment, a support sleeve is not used and the guide members are formed as part of the contactor housing 208. The housing 208 may include guide members 210, e.g. rails, that slidably received guide members 212, e.g, grooves, formed on the case 214 of the fuse assembly 206. Similarly, the housing 208 has guide members 216, e.g., rails, that engage with the guide members 218, e.g., grooves, formed on the housing 220 of the pre-charge module 204 to connect the pre-charge module 204 to the contactor 202.

Figure 7:
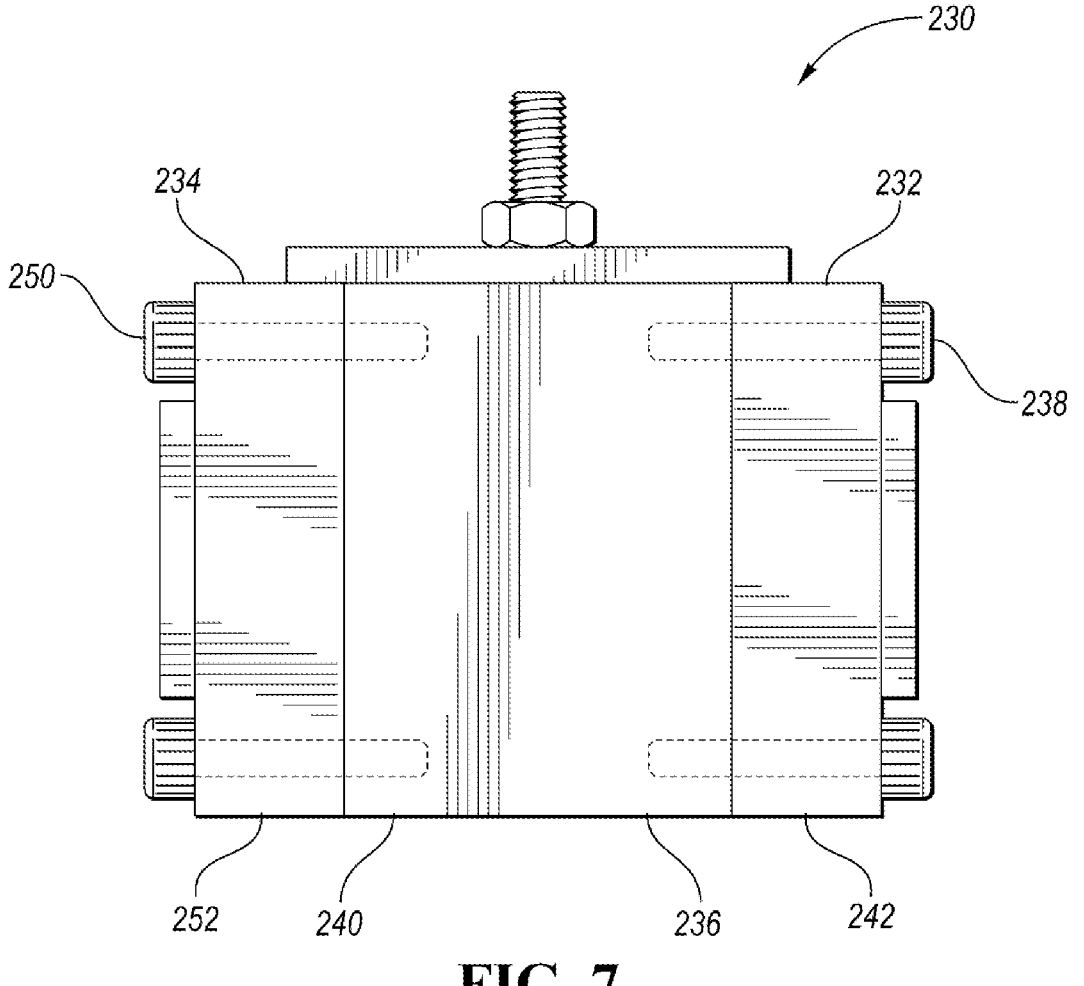
FIG. 7 is a side view of a contactor assembly according to yet another embodiment.

FIG. 7 illustrates yet another BEC 230 that supports a pre-charged module 232 and a fuse assembly 234. In this embodiment, fasteners are used to secure these components to the contactor 236. For example, threaded fasteners 238 may secure the pre-charge module 232 to the body 240 of the contactor 236. The fasteners 238 may extend through openings defined in the body 242 of the pre-charge module 232 and may engage with threaded openings supported within the body 240 of the contactor. Threaded fasteners 250 may secure the fuse assembly 234 to the body 240 of the contactor 236. The fasteners 250 may extend through openings defined in the body 252 of the assembly 234 and may engage with threaded openings supported within the body 240 of the contactor.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery assembly comprising:
a traction battery including a plurality of cells secured in one or more arrays by support structure;
a contactor electrically connected to the traction battery and including a housing mounted to the support structure, a pair of terminals extending from the housing, and a switching arrangement configured to electrically connect the terminals when closed; and
a pre-charge module connected to the traction battery solely through direct attachment to the contactor, the module including a pre-charge circuit electrically connected to the terminals and a case that is directly attached to the housing of the contactor.

2. The traction battery assembly of claim 1 further comprising:
a second contactor electrically connected to the traction battery and including a second housing mounted to the support structure, a pair of terminals extending from the second housing, and a switching arrangement configured to electrically connect the terminals of the second contactor when closed; and a capacitor module connected to the traction battery solely through direct attachment to the second contactor, the capacitor module including a capacitor circuit electrically connected to the terminals of the second contactor and a second case that is directly attached to the second housing.

3. The traction battery assembly of claim 1, wherein the housing defines a first connection feature and the case defines a second connection feature that engages with the first connection feature to secure the case to the housing.

4. The traction battery assembly of claim 1, wherein the housing defines a first guide member and the case defines a second guide member that slidably engages with the first guide member to secure the case to the housing.

5. The traction battery assembly of claim 4, wherein the first guide member is a rail and the second guide member is a groove that receives the rail.

6. The traction battery assembly of claim 5, wherein the rail is a pair of spaced rails, and the groove is a pair of spaced grooves that receive the rails.

7. The traction battery assembly of claim 6, wherein one of the housing and the case has a projection that clips into a slot defined in the other of the housing and the case.

8. The traction battery assembly of claim 1 further comprising a fuse assembly including a fuse and a case that is directly attached to the housing to solely support the fuse assembly to the traction battery via the contactor.

9. The traction battery assembly of claim 8, wherein the housing of the contactor defines first and second connection features on opposing sides of the housing, the case of the pre-charge module defines a third connection feature that engages with the first connection feature to secure the pre-charge module to the contactor, and the case of the fuse assembly defines a fourth connection feature that engages with the second connection feature to secure the fuse assembly to the contactor.

10. The traction battery assembly of claim 1 further comprising at least one fastener extending through the case and the housing to secure the pre-charge module to the contactor.

11. The traction battery assembly of claim 1, wherein the pre-charge module includes a pair of leads electrically connected to the circuit and received on the terminals.

12. The traction battery assembly of claim 1 wherein the housing has mounting feet that are secured to the support structure by fasteners that extend therethrough and connect with the support structure.

13. A traction battery assembly comprising:

a traction battery including a plurality of cells secured in one or more arrays;

a contactor electrically connected to the traction battery, the contactor including:
   a housing mounted to the support structure,
   a pair of terminals extending from the housing, and
   a switching arrangement configured to electrically connect the terminals when closed; and a pre-charge module structurally supported to the traction battery solely through direct attachment to the contactor, the module including a pre-charge circuit electrically connected to the terminals and a case that is directly attached to the housing of the contactor.

14. The traction battery assembly of claim 13 further comprising:

a second contactor electrically connected to the traction battery and including a second housing connected to the battery, a pair of terminals extending from the second housing, and a switching arrangement configured to electrically connect the terminals of the second contactor when closed; and a capacitor module connected to the traction battery solely through direct attachment to the second contactor, the capacitor module including a capacitor circuit electrically connected to the terminals of the second contactor and a second case that is directly attached to the second housing.

15. The traction battery assembly of claim 13, wherein the housing defines a first connection feature and the case defines a second connection feature that engages with the first connection feature to secure the case to the housing.

16. The traction battery assembly of claim 13, wherein the housing defines a first guide member and the case defines a second guide member that slidably engages with the first guide member to secure the case to the housing.

17. The traction battery assembly of claim 16, wherein the first guide member is a rail and the second guide member is a groove that receives the rail.

18. The traction battery assembly of claim 17, wherein the rail is a pair of spaced rails, and the groove is a pair of spaced grooves that receive the rails.

19. The traction battery assembly of claim 18, wherein one of the housing and the case has a projection that clips into a slot defined in the other of the housing and the case.

20. The traction battery assembly of claim 13 further comprising a fuse assembly including a fuse and a case that is directly attached to the housing to solely support the fuse assembly to the traction battery via the contactor, wherein the housing of the contactor defines first and second connection features on opposing sides of the housing, the case of the pre-charge module defines a third connection feature that engages with the first connection feature to secure the pre-charge module to the contactor, and the case of the fuse assembly defines a fourth connection feature that engages with the second connection feature to secure the fuse assembly to the contactor.

* * * * *